United States Patent [19]

Blazek

[11] 4,310,246
[45] Jan. 12, 1982

[54] PHOTOMETER SPHERE

[76] Inventor: Vladimir Blazek, No. 14, Butzweide, 5100 Aachen, Fed. Rep. of Germany

[21] Appl. No.: 127,356

[22] Filed: Mar. 5, 1980

[30] Foreign Application Priority Data

Aug. 10, 1978 [DE] Fed. Rep. of Germany ....... 2834982

[51] Int. Cl.³ .............................................. G01J 1/04
[52] U.S. Cl. .................................... 356/236; 250/228
[58] Field of Search ............... 356/236, 446, 448, 215; 250/228, 227

[56] References Cited

U.S. PATENT DOCUMENTS 2,347,067  4/1944  Shurcliff .......................... 356/236
2,364,825  12/1944  Shurcliff .............................. 356/236
3,815,977  6/1974  Vasiliev et al. ...................... 356/236

FOREIGN PATENT DOCUMENTS 2606675  9/1977  Fed. Rep. of Germany .

Primary Examiner—R. A. Rosenberger
Attorney, Agent, or Firm—John C. Smith, Jr.

[57] ABSTRACT

A photometer sphere includes a spherical interior encompassed by a diffusely reflecting wall, provided with apertures for incident light as well as for applying samples and photo detectors in the diffusely reflecting wall. The interior is filled completely by an optically homogenous, clear and stray-free material.

13 Claims, 4 Drawing Figures

PHOTOMETER SPHERE

BACKGROUND OF THE INVENTION

This invention relates generally to photometer spheres including a spherical interior encompassed by a diffusely reflecting wall, provided with apertures for incident light as well as for applying samples and photo detectors in the diffusely reflecting wall.

The optical integration properties of such diffusely reflecting photometer spheres known as "Ulbricht spheres" are utilized for many measurements in light engineering, (ULBRICHT, R., Die Bestimmung der mittleren, raumlichen Lichtintensitat durch nur eine Messung (The Determination of the Medium, Spatial Light Intensity by Only One Measurement); ETZ (Electrotechnical Magazine) 21 (1900), pages 595–597.

Numerous more or less modified Ulbricht spheres find application in various photometer apparatus (cf. e.g. HELBIG, E.: Grundlagen der Lichtmesstechnik, AVG Publishing House Leipzig (1972); DIN 5033; German Offenlegungsschrift No. 2,606,675 and German Offenlegungsschrift No. 2,757,196; KORTÜM, G.: Kolorimetrie, Photometrie und Spektrometrie, Berlin, Springer Publishing House (1955); prospectus of Nixdorf Computer AG, 4790 Paderborn: Nixdorf Computer in der Farbmetrik).

All known photometer spheres have the following disadvantages:

(1) Contamination of the diffusely reflecting coat of the internal wall and thus time-dependent variation of the integration properties. Measurement inaccuracies and the necessity of renewing the costly coat from time to time thereby resulting.

(2) The sample is not permitted to be of a liquid or partially liquid consistency, which occurs, however, quite often, e.g. for color measurements (humid samples such as paper, textiles, organs containing blood such as liver, brain etc.).

(3) Complicated production (interior must be geometrically spherical as precisely as possible).

(4) High production cost and permanent operation cost for renewing the remission coat.

SUMMARY OF THE INVENTION

It is, therefore, the object of the present invention to eliminate these disadvantages of conventional photometer spheres.

To attain this object the present invention provides a photometer sphere including a spherical interior encompassed by a diffusely reflecting wall, provided with apertures for incident light as well as for applying samples and photo detectors in the diffusely reflecting wall, wherein the interior is filled completely by an optically homogenous, clear and stray-free material.

BRIEF DESCRIPTION OF THE DRAWINGS

Two preferred embodiments of the present invention will now be described by way of example and with reference to FIGS. 2 and 3 of the accompanying schematic drawings in which.

DESCRIPTION OF THE PREFERRED EMBODIMENTS

Figure 1A:
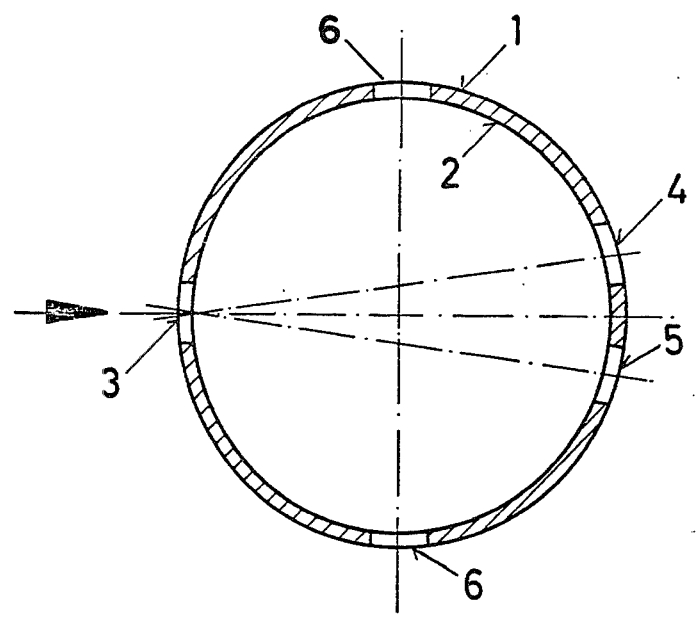
FIGS. 1a and 1b show two examples of conventional photometer spheres.
Figure 1B:
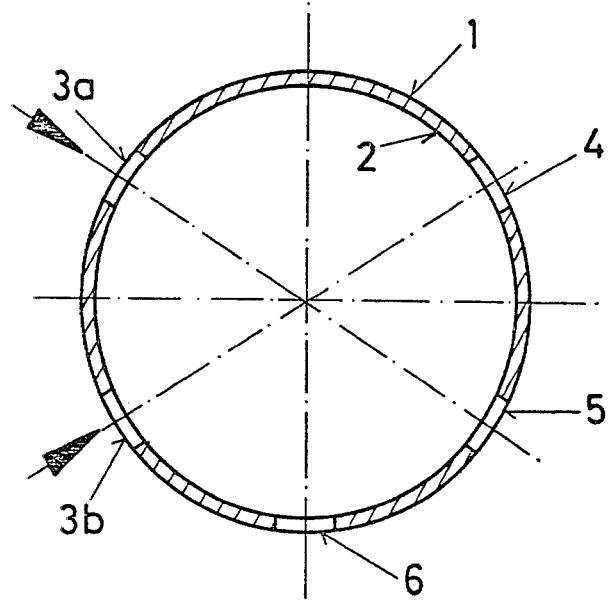

FIGS. 1a and 1b show two conventional photometer spheres 1. One or two measure beams are incident through one or two apertures 3 (3a, 3b) in the sphere, are either directed to a sample 4 or a measure standard 5 (wave-length dependent remission factor known), are partially reflected thereby and finally pass by further multiple remission at an aselectively diffusely reflecting coat 2 to at least one photodetector aperture 6. There the light streams are converted by a photo detector into an electrical signal. The sphere apertures, in particular the measure apertures 4 and 5, are not able to be covered in the conventional apparatus by a glass pane or a similar transparent material in the event a high measurement accuracy is to be obtained. For at the glass pane wavelength dependent reflexions would occur as a result of the difference of the refractive coefficient $n_{air}$ in the interior of the sphere and $n_{glass}$ of the glass pane.

Figure 2:
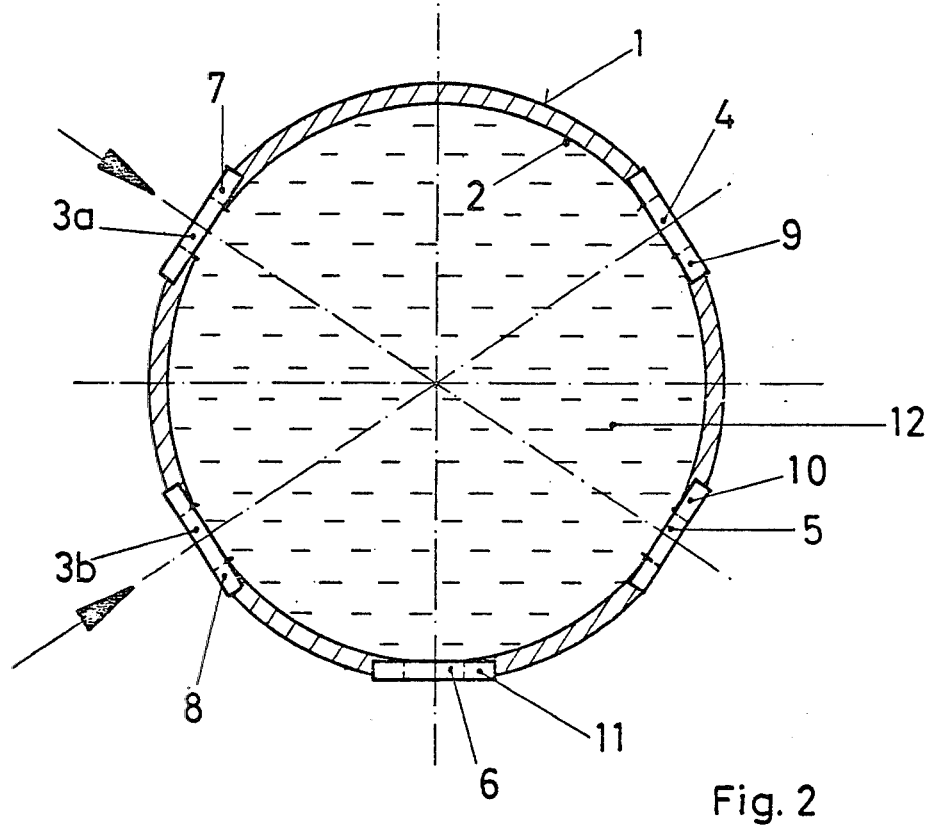
FIG. 2 shows a photometer sphere in accordance with the present invention, filled with a homogenous liquid.
Figure 3:
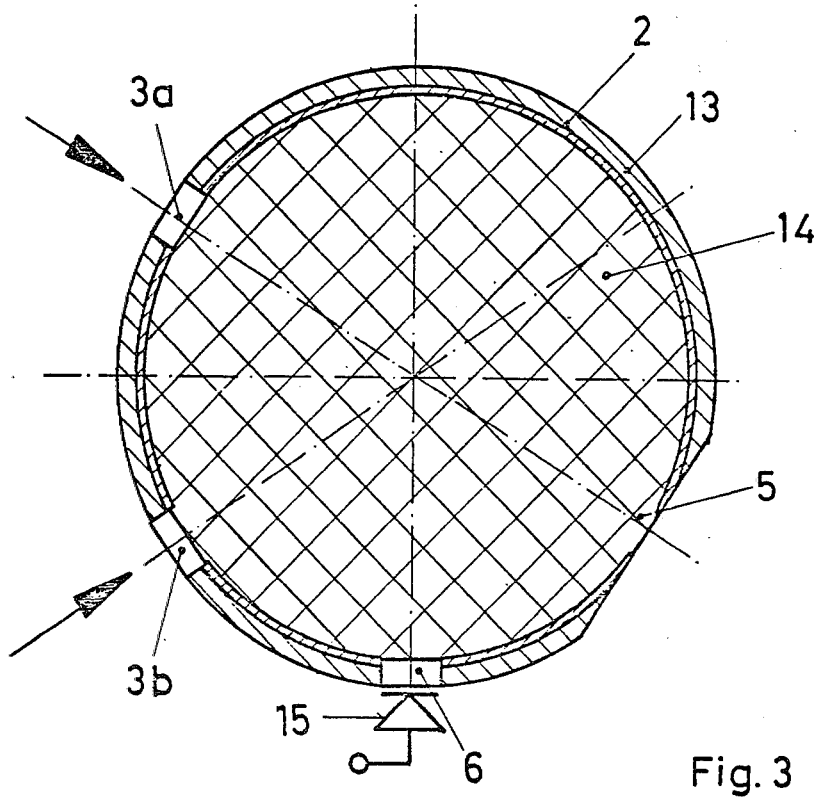
FIG. 3 shows a photometer sphere in accordance with the present invention, defined by a clear solid sphere.

The reference numerals in FIGS. 2 and 3 correspond to the according numerals in FIGS. 1a and 1b.

FIG. 2 shows a photometer sphere 1 which like the conventional Ulbricht spheres has a spherical interior. In contradistinction thereto, however, all wall apertures 3a, 3b, 4, 5 and 6 are sealed by glass panes 7, 8, 9, 10 and 11. Internally, the sphere 1 is filled instead of with air with an optically homogenous, transparent, non-straying immersion liquid 12, e.g. parafine oil, which has the same optical properties as glass has.

FIG. 3 shows a photometer sphere which is formed as a solid sphere 14 of an optically homogenous, clear and non-straying material, e.g. plexiglass. The production of such a solid sphere is simpler and cheaper as compared with the production of a hollow sphere. The solid sphere 14 may either by turned from solid material or cast in a mould.

The solid sphere 14 produced geometrically as precisely as possible is roughened at its surface, e.g. by sand blasting. Thereafter, the entire surface is coated with an aselective reflexion coat 2 (delustered white paint, consisting e.g. of $BaSO_4$+binder). This reflexion coat may finally additionally be protected mechanically by applying a further coat 13. The apertures 3a and 3b for incident light (directly incident light or light incident by means of light conductors), the photo detector aperture 6 and the measure aperture 5 are exposed of the coats 2 and 13 and are polished, the aperture 5 in such a way that a planar sample engages the internal wall of the sphere.

The diameter of this sphere may be conformed to the respective applications and may amount e.g. from 0.5 to 20 cms.

The diameters of the sphere apertures 3a, 3b, 5 and 6 may amount to one tenth of the sphere diameter in order to not affect detrimentally a proper optical integration.

The measure beam passes through the aperture 3a into the photometer sphere and is directed unweakened to the sample 5. The comparative beam is incident through the aperture 3b to the opposite sphere wall and is there reflected back diffusely in the sphere. The reflected measure and comparative beam proportions are up-integrated by multiple reflexion at the sphere wall and may be detected by a photo detector 15 at the photo detector aperture 6. Also, a plurality of photo detector apertures 6 may be provided at the photometer sphere respectively provided with one photo diode of different or identical sensitivity.

When at the aperture 5 a standard is applied having a known reflexion factor, the spectral course of the reflexion factor of the coat 2 is able to be determined. Thereby, a calibration is effected. As a result of this configuration, all disadvantages of the known photometer spheres are eliminated.

APPLICATION EXAMPLE

Miniature photometer sphere in conjunction with the subject matter of the German Offenlegungsschrift No. 2,606,675.

As already mentioned, the sphere diameter may be chosen depending on the respective application. One of the applicabilities is demonstrated by the following example.

The miniature photometer sphere has a diameter of about 5 mms. The measure beam and the comparative beam are introduced by means of two flexible light conductors (diameter about 0.1 mm) through the apertures 3a and 3b into the sphere. The measure beam exposes the sample which is applied to the aperture 5 (diameter of said aperture about 0.5 mms), the comparative beam impinges upon the diffusely reflecting sphere coat. A small-area Si photo diode (active area about 0.8 sq. mms, e.g. PIN diode or Avalanche diode) secured to the aperture 6 detects the beams reflected by the sample and the sphere wall (standard).

After electronically processing the photo diode current, the desired wavelength dependent reflexion factor of the sample may be indicated digitally in percent.

This miniature photometer sphere may for instance be secured to the end of an endoscope and introduced into confined areas in which with the known apparatus photometrical measurements (e.g. color analysis) could not be effected (e.g. introduction and measurement in the gastro-intestinal tract, bladder (tumor color), placenta (color analysis of amniotic fluid)).

The invention may be embodied in other specific forms without departing from the spirit or essential characteristics thereof. The embodiments are therefore to be considered in all respects as illustrative and not restrictive.

What is claimed is:

1. A photometer sphere including a spherical interior encompassed by a diffusely reflecting means, provided with at least one aperture for incident light, an aperture for applying a sample and an aperture for a photo detector in the diffusely reflecting means, wherein the interior is filled completely with an optically homogeneous, clear and non-scattering liquid or solid material.

2. A photometer sphere as set forth in claim 1, wherein each of said apertures is sealed by a glass pane and the spherical interior is filled with an optically homogeneous, clear and non-scattering immersion liquid which has the same optical properties as the glass panes.

3. A photometer sphere as set forth in claim 1, comprising a solid sphere of an optically homogeneous, clear and non-scattering solid material, said diffusely reflecting means comprising a diffusely reflecting coating on said sphere, said apertures being located in said diffusely reflecting coating on said solid sphere.

4. A photometer sphere as set forth in claim 3, wherein the diffusely reflecting coating is encompassed externally by a mechanically solid protective coating.

5. A photometer sphere as set forth in claim 4, wherein the surface of the solid sphere underneath said diffusely reflecting coating is roughened.

6. A photometer sphere as set forth in claim 5, wherein the surface of the solid sphere is polished in the region of said apertures.

7. A photometer sphere as set forth in claim 3, wherein said solid sphere of an optically homogenous, clear and non-scattering solid material comprises plexiglass.

8. A photometer sphere comprising:
   (a) wall means defining a spherical chamber having a diffusely reflecting interior surface;
   (b) a plurality of apertures in said wall means;
   (c) transparent sealing means for sealing each of said apertures;
   (d) one of said apertures being for a sample, another of said apertures being for a standard reflectance sample and at least one other aperture being for a photodetector; and
   (e) an optically homogeneous, clear and non-scattering immersion liquid filling said chamber, said liquid having substantially the same optical properties as said transparent sealing means.

9. A photometer sphere comprising:
   (a) a solid sphere of an optically homogeneous, clear and non-scattering solid material;
   (b) a coating on the surface of said sphere, the interior surface of said coating being diffusely reflecting; and
   (e) a plurality of apertures in said coating, one of said apertures being for a sample, another of said apertures being for a standard reflectance sample and at least one other aperture being for a photodetector.

10. A photometer sphere as set forth in claim 9 further comprising a mechanically solid protective coating externally encompassing said first-mentioned coating having a diffusely reflecting interior surface.

11. A photometer sphere as set forth in claim 10 wherein the surface of said sphere underneath said diffusely reflecting coating is roughened.

12. A photometer sphere as set forth in claim 11 wherein the surface of said solid sphere is polished in the region of said apertures.

13. A photometer as set forth in claim 9 wherein said solid sphere comprises plexiglass.

* * * * *